United States Patent
Delplancke et al.

(10) Patent No.: US 11,377,625 B2
(45) Date of Patent: Jul. 5, 2022

(54) CLEANING COMPOSITIONS WITH POLYALKANOLAMINES

(71) Applicant: BASF SE, Ludwigshafen (DE)

(72) Inventors: Patrick Firmin August Delplancke, Steenhuize-Wijnhuize (BE); Frank Hulskotter, Bad Duerkheim (DE); Bjoern Ludolph, Ludwigshafen (DE); Steffen Maas, Bubenheim (DE); Sophia Rosa Ebert, Mannheim (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 14/973,762

(22) Filed: Dec. 18, 2015

(65) Prior Publication Data

US 2017/0175039 A1    Jun. 22, 2017

(51) Int. Cl.
| | |
|---|---|
| *C11D 1/00* | (2006.01) |
| *C11D 3/30* | (2006.01) |
| *C11D 3/37* | (2006.01) |
| *C11D 1/66* | (2006.01) |
| *C11D 1/02* | (2006.01) |
| *C08G 73/02* | (2006.01) |
| *C11D 11/00* | (2006.01) |

(52) U.S. Cl.
CPC .......... *C11D 3/3723* (2013.01); *C08G 73/024* (2013.01); *C11D 1/02* (2013.01); *C11D 1/66* (2013.01); *C11D 3/30* (2013.01); *C11D 11/0023* (2013.01)

(58) Field of Classification Search
CPC .... C11D 1/02; C11D 1/66; C11D 3/30; C11D 3/372; C11D 3/3723
USPC ................ 510/235, 238, 421, 426, 475, 499
See application file for complete search history.

(56) References Cited

U.S. PATENT DOCUMENTS

| | | | | |
|---|---|---|---|---|
| 8,093,202 | B2* | 1/2012 | Danziger | C11D 3/3723 510/360 |
| 8,097,577 | B2 | 1/2012 | Danziger et al. | |
| 8,129,326 | B2* | 3/2012 | Misske | C08G 73/024 510/356 |
| 8,247,368 | B2* | 8/2012 | Danziger | C11D 3/3723 510/360 |
| 10,266,795 | B2* | 4/2019 | Delplancke | C11D 3/3723 |
| 2003/0171245 | A1* | 9/2003 | Goovaerts | C11D 17/06 510/444 |
| 2009/0124528 | A1 | 5/2009 | Danziger et al. | |
| 2009/0124529 | A1* | 5/2009 | Danziger | C08G 73/02 510/276 |
| 2010/0234631 | A1* | 9/2010 | Misske | C08G 73/024 558/27 |
| 2011/0290659 | A1 | 12/2011 | Roeger-Gopfert et al. | |
| 2011/0312869 | A1* | 12/2011 | Danziger | C11D 3/3723 510/357 |
| 2014/0162931 | A1* | 6/2014 | De Meirleir | C11D 3/2093 510/417 |
| 2017/0175038 | A1 | 6/2017 | Delplancke et al. | |

FOREIGN PATENT DOCUMENTS

WO    WO2014012812 A1    1/2014

OTHER PUBLICATIONS

International Search Report; International Application No. PCT/US2016/065092; dated Mar. 24, 2017; 14 pages.
International Search Report; International Application No. PCT/US2016/065094; dated Mar. 24, 2017; 14 pages.
U.S. Appl. No. 14/973,760, filed Dec. 18, 2015, Delplancke, et al.

* cited by examiner

*Primary Examiner* — Gregory R Delcotto
(74) *Attorney, Agent, or Firm* — Armstrong Teasdale LLP

(57) ABSTRACT

The invention relates to cleaning compositions comprising polyalkanolamine polymers. The present invention further relates to methods of cleaning dishware and hard surfaces using such cleaning compositions.

8 Claims, No Drawings

CLEANING COMPOSITIONS WITH POLYALKANOLAMINES

FIELD OF THE INVENTION

The present invention is directed to cleaning compositions containing polyalkanolamine polymers.

BACKGROUND OF THE INVENTION

In the field of cleaning compositions, various types of polymers are well established as components within such cleaners. Depending on the intended use, different types of polymers can be employed. Well-known problems/tasks in the field of cleaning compositions are as follows:

Cooked-, baked- and burnt-on soils are amongst the most severe types of soils to remove from surfaces. Traditionally, the removal of cooked-, baked- and burnt-on soils from cookware and tableware requires soaking the soiled object prior to mechanical action. Manual dishwashing processes require a tremendous rubbing effort to remove cooked-, baked- and burnt-on soils and this can be detrimental to the safety and condition of the cookware/tableware.

Another problem faced in both manual dishwashing and cleaning of hard surfaces is grease removal, in particular grease removal from hydrophobic substrates such as plastics. Grease removal also includes the removal of ordinary fat residues such as residues obtained from the preparation/cooking high fat containing foods, such as meat.

Users not only seek good cleaning but they also expect the washed items to be pleasant to the touch and not to be left feeling greasy to the touch during and after the rinse.

Hand dishwashing trends are changing. Traditionally, the cleaning has been done in a sink full of water with the detergent diluted in it. Nowadays, the trend is toward the use of a cleaning implement, such as a sponge. The cleaning composition is dosed onto the sponge, before or after the sponge is wetted, a soiled item is then wiped and subsequently rinsed under running water. This new way of hand dishwashing, sometimes referred to as direct application, places the cleaning composition in a new environment that needs to be taken into account for the design of the composition. With the new preference of using direct application, there is a need to provide a cleaning composition that performs well under the new using conditions, in particular for the removal of polymerized grease such as that left from cooked-, baked- and burnt-on soils.

As result there is a need for new cleaning ingredients that can be successfully employed in the field of cleaning compositions, such as hand dish-washing and hard surface cleaning compositions. Compositions based on polymers presently disclosed provide good cleaning properties, in particular good grease cleaning properties; they are well suited for especially cooked-, baked- and burnt-on soil removal. The same advantageous properties as for the polymers presently disclosed also apply for the derivatives of the polymers according to the present invention.

The polymers according to the present invention (as well as corresponding derivatives) also have an improved performance in the field of fat removal at low temperatures. By consequence, the polymers presently disclosed can be successfully employed in cleaning compositions, in particular in manual dish washing cleaning compositions. Besides cooked-, baked- and burnt-on soils, the respective cleaning compositions based on the presently disclosed (as well as derivatives thereof) can also be employed in manual dish washing composition for grease removal from hydrophobic substrates such as plastics.

SUMMARY OF THE INVENTION

The present invention relates to novel cleaning compositions comprising new polyalkanolamine polymers that provide improved grease cleaning benefits, even at lower surfactant levels or at reduced temperatures. The cleaning compositions comprise a polyalkanolamine polymer obtainable by a process comprising step a), wherein a) condensing at least one component a1), optionally at least one component a2) and/or optionally at least one component a3), which are defined as follows:
   a1) is at least one compound selected from N-(hydroxyalkyl)amines of formulae (I.a) and/or (I.b),

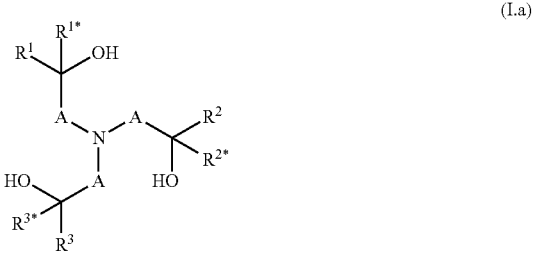
(I.a)

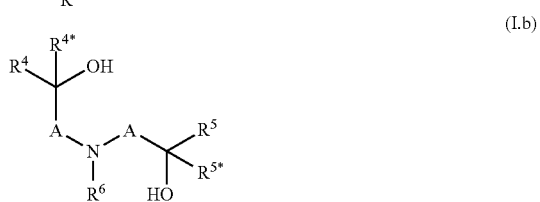
(I.b)

wherein
A are independently selected from $C_1$-$C_6$-alkylene,
$R^1$, $R^{1*}$, $R^2$, $R^{2*}$, $R^3$, $R^{3*}$, $R^4$, $R^{4*}$, $R^5$, $R^{5*}$ and $R^6$ are independently of one another selected from hydrogen, alkyl, cycloalkyl or aryl, wherein the last three mentioned radicals may be optionally substituted, and
a2) is at least one compound selected from polyols of formula $Y(OH)_n$,
    wherein
    n is an integer from 2 to 4 and
    Y denotes a bivalent, trivalent or tetravalent aliphatic, cycloaliphatic or aromatic radical having 2 to 10 carbon atoms, and
a3) is at least one compound selected from polyamines of formula $Y'(NHR^y)_m$,
    wherein
    m is an integer from 2 to 4,
    Y denotes a bivalent, trivalent or tetravalent aliphatic, cycloaliphatic or aromatic radical having 2 to 10 carbon atoms, and
    $R^y$ has one of the meanings given for $R^6$ or two radicals $R^y$ together may form a $C_1$-$C_6$-alkylene group,
    wherein the sum of the amount of components a1), a2) and a3) is more than 70 wt.-% in relation to the sum of the amount of all monomers employed in the condensation according to step a) in order to obtain a polyether having remaining hydroxyl groups and optionally remaining secondary amino groups.

The present invention further relates to methods of cleaning hard surfaces, such as dishware, with such cleaning compositions.

DETAILED DESCRIPTION OF THE INVENTION

The term "alkyl" as used herein and in the term alkoxy refers to saturated straight-chain or branched hydrocarbon radicals. $C_1$-$C_4$-alkyl refers to saturated straight-chain or branched hydrocarbon radicals having 1 to 4 carbon atoms such as methyl, ethyl, propyl, 1-methylethyl, butyl, 1-methylpropyl, 2-methylpropyl and 1,1-dimethylethyl. Optionally substituted alkyl refers to an alkyl radical which is unsubstituted or wherein a part or all of the hydrogen atoms are replaced by hydroxy, halogen, cyano or $C_1$-$C_4$-alkoxy. Preferably alkyl is unsubstituted.

The term "cycloalkyl" as used herein refers to saturated or partially unsaturated mono- or bicyclic hydrocarbon radicals. Preferably the term cycloalkyl relates to monocyclic hydrocarbon radicals having 3 to 8, in particular 3 to 6 carbon atoms ($C_3$-$C_8$-cycloalkyl, $C_3$-$C_6$-cycloalkyl). Examples of such preferred cycloalkyl radicals are cyclopropyl, cyclobutyl, cyclopentyl, cyclohexyl, cycloheptyl and cyclooctyl. Optionally substituted cycloalkyl refers to a cycloalkyl radical which is unsubstituted or wherein a part or all of the hydrogen atoms are replaced by hydroxy, halogen, cyano, $C_1$-$C_4$-alkyl or $C_1$-$C_4$-alkoxy. Preferably cycloalkyl is unsubstituted or carries 1, 2 or 3 $C_1$-$C_4$-alkyl radicals.

The term "$C_1$-$C_6$-alkylene" as used herein refers to a saturated, divalent straight chain or branched hydrocarbon chains of 1, 2, 3, 4, 5 or 6 carbon groups, examples including methylene, ethane-1,2-diyl, propane-1,3-diyl, propane-1,2-diyl, 2-methylpropane-1,2-diyl, 2,2-dimethylpropane-1,3-diyl, butane-1,4-diyl, butane-1,3-diyl (=1-methylpropane-1,3-diyl), butane-1,2-diyl, butane-2,3-diyl, 2-methyl-butan-1,3-diyl, 3-methyl-butan-1,3-diyl (=1,1-dimethylpropane-1,3-diyl), pentane-1,4-diyl, pentane-1,5-diyl, pentane-2,5-diyl, 2-methylpentane-2,5-diyl (=1,1-dimethylbutane- 1,3-diyl) and hexane-1,6-diyl.

The term "aryl" as used herein refers to phenyl or naphthyl, preferably phenyl. Optionally substituted aryl refers to an aryl radical which is unsubstituted or wherein a part or all of the hydrogen atoms are replaced by hydroxy, halogen, cyano, $C_1$-$C_4$-alkyl or $C_1$-$C_4$-alkoxy. Preferably aryl is unsubstituted or carries 1, 2 or 3 $C_1$-$C_4$-alkyl radicals.

The term "alkylene oxide" as used herein relates to alkyl or alkylaryl compounds carrying at least one, preferably 1 or 2, in particular 1 epoxy group at the alkyl moieties of the compound. Examples of alkyl compounds carrying one epoxy group are epoxyethane (=ethylene oxide), epoxypropane (=propylene oxide), 1,2-epoxybutane (=alpha butylene oxide), 2,3-epoxybutane (=beta butylene oxide), 1,2-epoxy-2-methylpropane (=isobutylene oxide), 1,2-epoxypentane, 2,3-epoxypentane, 1,2-epoxy-2-methylbutane, 2,3-epoxy-2-methylbutane, 1,2-epoxyhexane, 2,3-epoxyhexane, 3,4-epoxyhexane, 1,2-epoxydecane, 1,2-epoxydodecane, 1,2-epoxytetradecane, and/or 1,2-epoxyhexadecane. Examples of alkylaryl compounds carrying one epoxy group are optionally substituted (1,2-epoxyethylene)benzene (=styrene oxide) compounds.

The term "condensation" as used herein refers to a chemical reaction wherein a covalent bond between two corresponding functional groups is formed together with the formal loss of a small molecule such as water. A condensation as such according to step a) of the present invention is known to a person skilled in the art. Preferably the term condensation refers to an etherification together with a dehydration reaction.

Cleaning Compositions

The inventive cleaning compositions of the present invention comprise new polyalkanolamine polymers.

The invention relates to a polymer obtainable by a process comprising the steps a) and b).

In step a) at least one component a1), optionally at least one compound a2) and/or optionally at least one compound a3) are condensated.

a1) is at least one compound selected from N-(hydroxyalkyl)amines of formulae (I.a) and/or (I.b),

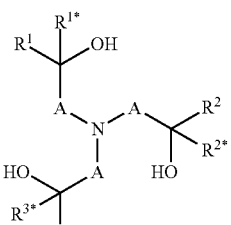

(I.a)

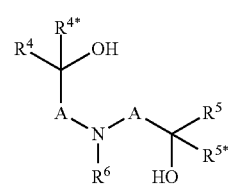

(I.b)

wherein

A are independently selected from $C_1$-$C_6$-alkylene,
$R^1$, $R^{1*}$, $R^2$, $R^{2*}$, $R^3$, $R^{3*}$, $R^4$, $R^{4*}$, $R^5$, $R^{5*}$ and $R^6$ are independently of one another selected from hydrogen, alkyl, cycloalkyl or aryl, wherein the last three mentioned radicals may be optionally substituted.

Preferably in component a1) in formulae (I.a) and/or (I.b)
i) A is a methylene group, which is unsubstituted or carries one substituent selected from $C_1$-$C_4$-alkyl, and/or
ii) $R^1$, $R^{1*}$, $R^2$, $R^{2*}$, $R^3$, $R^{3*}$, $R^4$, $R^{4*}$, $R^5$, $R^{5*}$ and $R^6$ are independently of one another selected from hydrogen and $C_1$-$C_4$-alkyl.

More preferably, the compound according to formula (I.a) is selected from triethanolamine, triisopropanolamine and tributan-2-olamine and/or the compound according to formula (I.b) is selected from N-methyldiethanolamine, N,N-bis-(2-hydroxypropyl)-N-methylamine, N,N-bis-(2-hydroxybutyl)-N-methylamine, N-isopropyldiethanolamine, N-n-butyldiethanolamine, N-sec-butyldiethanolamine, N-cyclohexyldiethanolamine, N-benzyldiethanolamine, N-4-tolyldiethanolamine and N,N-Bis-(2-hydroxyethyl)-anilin.

If present, the optional component a2) is at least one compound selected from polyols of formula Y' (OH)$_n$,
wherein
n is an integer from 2 to 4 and
Y denotes a bivalent, trivalent or tetravalent aliphatic, cycloaliphatic or aromatic radical having 2 to 10 carbon atoms.

Preferably in component a2) the polyol is an aliphatic polyol, a cycloaliphatic polyol or an arylaliphatic polyol.

More preferably in component a2) the polyol is ethylene glycol, propylene glycol, butylene glycol, glycerine, tri(hydroxymethyl)ethane, tri(hydroxymethyl)propane or pentaerythrit, 1,4-dihydroxycyclohexane or 1,4-bis-(hydroxymethyl)benzene.

If present, the optional component a3) is at least one compound selected from polyamines of formula $Y'(NHR^y)_m$, wherein m is an integer from 2 to 4, Y denotes a bivalent, trivalent or tetravalent aliphatic, cycloaliphatic or aromatic radical having 2 to 10 carbon atoms, and $R^y$ has one of the meanings given for $R^6$ or two radicals $R^y$ together may form a $C_1$-$C_6$-alkylene group.

Preferably in component a3) the polyamine is selected from ethylenediamine, N,N'-dimethylethylenediamine, N,N'-diethylethylenediamine, 1,2-diaminopropane, 1,3-diaminopropane, 1,2-diaminocyclohexane, 1,3-diaminocyclohexane, 1,4-diaminocyclohexane or piperazine.

The sum of the amount of components a1), a2) and a3) is more than 70 wt.-% in relation to the sum of the amount of all monomers employed in the condensation according to step a) in order to obtain a polyether having remaining hydroxyl groups and optionally remaining secondary amino groups. For the sake of completeness, it is indicated that components a1), a2) and a3) are employed as monomers within the condensation according to step a) of the present invention.

In one embodiment of the invention the sum of the amount of components a1), a2) and a3) is more than 90%, more preferably more than 95%, even more preferably more than 99.5%, most preferably 100%, in relation to the sum of the amount of all monomers employed in the condensation according to step a).

In another embodiment of the invention
i) 50 to 100 wt.-%, preferably 75 to 100 wt.-%, most preferably 95 to 100 wt.-% of component a1),
ii) 0 to 50 wt.-%, preferably 0 to 25 wt.-%, most preferably 0 to 5 wt.-% of component a2), and
iii) 0 to 50 wt.-%, preferably 0 to 25 wt.-%, most preferably 0 to 5 wt.-% of component a3) are employed in relation to the sum of the amount of all monomers of step a).

In a further embodiment of the invention at least 95 wt.-% of all monomers employed in step a) are selected from component a1), component a1) is preferably selected from at least one compound according to formula (Ia).

More preferably at least 99% wt.-% of all monomers employed in step a) are selected from component a1), component a1) is preferably selected from at least one compound according to formula (I.a). Most preferably 100% wt.-% of all monomers employed in step a) are selected from component a1), component a1) is preferably selected from at least one compound according to formula (I.a).

The condensation of at least one component a1) and optionally further monomer such as components a2) and/or a3), preferably the condensation of the at least one N-(hydroxyalkyl)amine of formulae (I.a) and/or (I.b) can be performed under the conditions given in e.g. EP 0 441 198 or U.S. Pat. No. 5,393,463 or WO02014/012812.

The N-(hydroxyalkyl)amine polyethers are usually prepared by condensing the N-(hydroxyalkyl)amines of formulae (I.a) and/or (I.b) in the presence of an acid, preferably phosphorous acid ($H_3PO_3$) and/or hypophosphorous acid ($H_3PO_2$). The acid, in particular the phosphorous acid and/or hypophosphorous acid, is preferably used in an amount of from 0.05 to 2% by weight (calculated as 100% acid) and preferably from 0.1 to 1.0% by weight of the N-(hydroxyalkyl)amine(s) to be condensed.

Usually, the condensation (reaction) is effected using water withdrawing conditions familiar to a skilled person, such as distilling off the water of the reaction.

Usually, the temperature used for the condensation is in the range of 120 to 280° C., preferably 150 to 260° C. and more preferably 180 to 240° C. The reaction is usually carried out over a period of from 1 to 16 hours and preferably from 2 to 8 hours. Advantageously, the degree of condensation is controlled by varying the temperature and time of reaction.

The viscosity of the resulting condensation products is usually in the range of 1 000 to 50 000 mPa·s, preferably 2 000 to 20 000 mPa·s, and more preferably 3 000 to 10 000 mPa·s (measured, in all cases, on the undiluted product at 20° C.).

The number average molecular weight of the resulting condensation products is usually in the range of 250 to 50 000 g/mol, preferably 500 to 25 000 g/mol, and more preferably 1 000 to 15 000 g/mol. The hydroxyl number of the resulting condensation products is usually in the range of 200 to 1 500 mg(KOH)/g, and preferably 300 to 1 000 g/mol.

The condensation of the N-(hydroxyalkyl)amines can also be effected by heating the compounds of formulae (I.a) and/or (I.b) and the acid, as defined above, in the presence of an effective amount of an additional catalyst, such as zinc halides or aluminium sulphate or zinc halide/carboxylic acid or $Al_2(SO_4)_3$/carboxylic acid, as described in U.S. Pat. No. 4,505,839. Preferred additional catalysts are $ZnCl_2$/acetic acid and $Al_2(SO_4)_3$/acetic acid. Generally the additional catalyst if present is used in an amount of 0.01 to 5.0% by weight based on the of the N-(hydroxyalkyl)amine(s) to be condensed, preferably about 0.01 to 1.25% by weight.

In one embodiment of the invention the addition of formaldehyde and/or triazines as monomers in the condensation step a) is excluded. In particular melamine is excluded as a monomer in step a) in this embodiment. In an embodiment of the invention, in step a) at least one component a1) selected from N-(hydroxyalkyl)amines of formulae (I.a) is condensated. In another embodiment of the invention in step a) at least one component a1) selected from N-(hydroxyalkyl)amines of formulae (I.a) and at least one component a2) are condensated.

In a further embodiment of the invention in step a) at least one component a1) selected from N-(hydroxyalkyl)amines of formulae (I.a) and at least one component a3) are condensated. In a further embodiment of the invention in step a) at least one component a1) selected from N-(hydroxyalkyl)amines of formulae (I.a), at least one component a2) and at least one component a3) are condensated. In an embodiment of the invention, in step a) at least one component a1) selected from N-(hydroxyalkyl)amines of formulae (I.b) is condensated.

In another embodiment of the invention in step a) at least one component a1) selected from N-(hydroxyalkyl)amines of formulae (I.b) and at least one component a2) are condensated. In a further embodiment of the invention in step a) at least one component a1) selected from N-(hydroxyalkyl)amines of formulae (I.b) and at least one component a3) are condensated.

In a further embodiment of the invention in step a) at least one component a1) selected from N-(hydroxyalkyl)amines of formulae (I.b), at least one component a2) and at least one component a3) are condensated. In an embodiment of the invention, in step a) at least one component a1) selected from N-(hydroxyalkyl)amines of formulae (I.b), wherein $R^6$ is hydrogen, is condensated.

In another embodiment of the invention in step a) component a1) selected from N-(hydroxyalkyl)amines of formulae (I.b), wherein $R^6$ is hydrogen, and at least one component a2) are condensated. In a further embodiment of the invention in step a) at least one component a1) selected from N-(hydroxyalkyl)amines of formulae (I.b), wherein $R^6$ is hydrogen, and at least one component a3) are condensated.

In a further embodiment of the invention in step a) at least one component a1) selected from N-(hydroxyalkyl)amines of formulae (I.b), wherein $R^6$ is hydrogen, at least one component a2) and at least one a3) are condensated.

Another aspect of the invention is a process for preparing the inventive polymer as described above, wherein the process comprises the step a):
a) condensation of at least one component a1), optionally at least one component a2) and/or optionally at least one component a3), which are defined as follows:
  a1) is at least one compound selected from N-(hydroxyalkyl)amines of formulae (I.a) and/or (I.b),

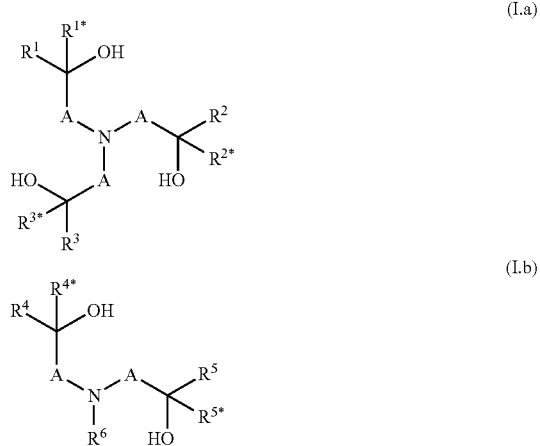

wherein
A are independently selected from $C_1$-$C_6$-alkylene,
$R^1$, $R^{1*}$, $R^2$, $R^{2*}$, $R^3$, $R^{3*}$, $R^4$, $R^{4*}$, $R^5$, $R^{5*}$ and $R^6$ are independently of one another selected from hydrogen, alkyl, cycloalkyl or aryl, wherein the last three mentioned radicals may be optionally substituted.
a2) is at least one compound selected from polyols of formula $Y(OH)_n$,
  wherein
  n is an integer from 2 to 4 and
  Y denotes a bivalent, trivalent or tetravalent aliphatic, cycloaliphatic or aromatic radical having 2 to 10 carbon atoms.
a3) is at least one compound selected from polyamines of formula $Y'(NHR^y)_m$,
  wherein
  m is an integer from 2 to 4,
  Y denotes a bivalent, trivalent or tetravalent aliphatic, cycloaliphatic or aromatic radical having 2 to 10 carbon atoms, and
  $R^y$ has one of the meanings given for $R^6$ or two radicals $R^y$ together may form a $C_1$-$C_6$-alkylene group.

The sum of the amount of components a1), a2) and a3) is more than 70 wt.-% in relation to the sum of the amount of all monomers employed in the condensation according to step a) in order to obtain a polyether having remaining hydroxyl groups and optionally remaining secondary amino groups.

The polyalkanolamine polymers according to the present invention can be added to the cleaning compositions in amounts of generally from 0.05 to 10% by weight, preferably from 0.1 to 5% by weight and more preferably from 0.15 to 2.5% by weight, based on the particular overall composition.

Surfactant

Surfactants may be desired herein as they contribute to the cleaning performance of the cleaning compositions of the present invention. Suitable surfactants are selected from the group consisting of a nonionic surfactant or a mixture thereof; an anionic surfactant or a mixture thereof; an amphoteric surfactant or a mixture thereof; a zwitterionic surfactant or a mixture thereof; a cationic surfactant or a mixture thereof; and mixtures thereof.

In the preferred embodiment wherein the composition is a hard surface cleaning composition, the composition comprises from about 1% to about 30%, preferably from about 3% to about 20%, and more preferably from about 5% to about 15% by weight of the total composition of a surfactant.

In the preferred embodiment wherein the composition is a hand dishwashing cleaning composition, the composition may comprise from about 5% to about 80%, preferably from about 10% to about 60%, more preferably from about 12% to about 45% by weight of the total composition of a surfactant. In preferred embodiments, the surfactant herein has an average branching of the alkyl chain(s) of more than about 10%, preferably more than about 20%, more preferably more than about 30%, and even more preferably more than about 40% by weight of the total surfactant.

Nonionic Surfactant

In one preferred embodiment, the cleaning composition comprises a nonionic surfactant. Suitable nonionic surfactants may be alkoxylated alcohol nonionic surfactants, which can be readily made by condensation processes which are well-known in the art. However, a great variety of such alkoxylated alcohols, especially ethoxylated and/or propoxylated alcohols, are commercially available. Surfactant catalogs are available which list a number of such surfactants, including nonionics.

Accordingly, preferred alkoxylated alcohols for use herein are nonionic surfactants according to the formula $$R^1O(E)_e(P)_pH \qquad \text{Formula (II)}$$

where $R^1$ is a hydrocarbon chain of from about 2 to about 24 carbon atoms, E is ethylene oxide, P is propylene oxide, and e and p which represent the average degree of, respectively ethoxylation and propoxylation, are of from about 0 to about 24 (with the sum of e+p being at least 1). Preferably, the hydrophobic moiety of the nonionic compound can be a primary or secondary, straight or branched alcohol having from about 8 to about 24 carbon atoms.

In some embodiments, preferred nonionic surfactants are the condensation products of ethylene oxide and/or propylene oxide with an alcohol having a straight or branched alkyl chain, having from about 6 to about 22 carbon atoms, preferably from about 9 to about 15 carbon atoms, wherein the degree of alkoxylation (ethoxylation and/or propoxylation) is from about 1 to about 25, preferably from about 2 to about 18, and more preferably from about 5 to about 12 moles of alkylene oxide per mole of alcohol. Particularly preferred are such surfactants containing from about 5 to about 12 moles of ethylene oxide per mole of alcohol. Such suitable nonionic surfactants are commercially available from Shell, for instance, under the trade name Neodol® or from BASF under the trade name Lutensol®.

Preferably, the nonionic surfactant is comprised in a typical amount of from about 2% to about 40%, preferably from about 3% to about 30% by weight of the liquid cleaning composition, and preferably from about 3 to about 20% by weight of the total composition.

Also suitable are alkylpolyglycosides having the formula

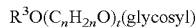
$R^3O(C_nH_{2n}O)_t$(glycosyl)   Formula (III)

wherein $R^3$ of formula (III) is selected from the group consisting of an alkyl or a mixture thereof; an alkyl-phenyl or a mixture thereof; a hydroxyalkyl or a mixture thereof; a hydroxyalkylphenyl or a mixture thereof; and mixtures thereof, in which the alkyl group contains from about 10 to about 18, preferably from about 12 to about 14 carbon atoms; n of formula (III) is about 2 or about 3, preferably about 2; t of formula (III) is from about 0 to about 10, preferably about 0; and z of formula (III) is from about 1.3 to about 10, preferably from about 1.3 to about 3, most preferably from about 1.3 to about 2.7. The glycosyl is preferably derived from glucose. Also suitable are alkyl glycerol ether and sorbitan ester.

Also suitable is fatty acid amide surfactant having the formula (IV):

(IV)

wherein $R^6$ of formula (IV) is an alkyl group containing from about 7 to about 21, preferably from about 9 to about 17, carbon atoms, and each $R^7$ of formula (IV) is selected from the group consisting of hydrogen; a $C_1$-$C_4$ alkyl or a mixture thereof; a $C_1$-$C_4$ hydroxyalkyl or a mixture thereof; and a —$(C_2H_4O)_y$H or a mixture thereof, where y of formula (IV) varies from about 1 to about 3. Preferred amide can be a $C_8$-$C_{20}$ ammonia amide, a monoethanolamide, a diethanolamide, and an isopropanolamide.

Other preferred nonionic surfactants for use in the liquid cleaning composition may be the mixture of nonyl ($C_9$), decyl ($C_{10}$) undecyl ($C_{11}$) alcohols modified with, on average, about 5 ethylene oxide (EO) units such as the commercially available Neodol 91-5® or the Neodol 91-8® that is modified with on average about 8 EO units. Also suitable are the longer alkyl chains ethoxylated nonionics such as $C_{12}$ or $C_{13}$ modified with 5 EO (Neodol 23-5®). Neodol® is a Shell tradename. Also suitable is the $C_{12}$ or $C_{14}$ alkyl chain with 7 EO, commercially available under the trade name Novel 1412-7® (Sasol) or the Lutensol A 7 N® (BASF).

Preferred branched nonionic surfactants are the Guerbet $C_{10}$ alcohol ethoxylates with 5 EO such as Ethylan 1005, Lutensol XP 50® and the Guerbet $C_{10}$ alcohol alkoxylated nonionics (modified with EO and PO (propylene oxide)) such as the commercially available Lutensol XL® series (X150, XL70, etc). Other branching also includes oxo branched nonionic surfactants such as the Lutensol ON 50® (5 EO) and Lutensol ON70® (7 EO). Other suitable branched nonionics are the ones derived from the isotridecyl alcohol and modified with ethylene oxide such as the Lutensol TO7® (7 EO) from BASF and the Marlipal O 13/70® (7 EO) from Sasol. Also suitable are the ethoxylated fatty alcohols originating from the Fisher & Tropsch reaction comprising up to about 50% branching (about 40% methyl (mono or bi) about 10% cyclohexyl) such as those produced from the Safol® alcohols from Sasol; ethoxylated fatty alcohols originating from the oxo reaction wherein at least 50 wt % of the alcohol is $C_2$ isomer (methyl to pentyl) such as those produced from the Isalchem® alcohols or Lial® alcohols from Sasol; the ethoxylated fatty alcohols originating from the modified oxo reaction wherein at least about 15% by weight of the alcohol is $C_2$ isomer (methyl to pentyl) such as those produced from the Neodol® alcohols from Shell.

In one preferred embodiment, the weight ratio of total surfactant to nonionic surfactant is from about 2 to about 10, preferably from about 2 to about 7.5, more preferably from about 2 to about 6.

Anionic Surfactant

Anionic surfactants include, but are not limited to, those surface-active compounds that contain an organic hydrophobic group containing generally 8 to 22 carbon atoms or generally 8 to 18 carbon atoms in their molecular structure and at least one water-solubilizing group preferably selected from sulfonate, sulfate, and carboxylate so as to form a water-soluble compound. Usually, the hydrophobic group will comprise a C8-C22 alkyl, or acyl group. Such surfactants are employed in the form of water-soluble salts and the salt-forming cation usually is selected from sodium, potassium, ammonium, magnesium and mono-, di- or tri-C2-C3 alkanolammonium, with the sodium, cation being the usual one chosen.

Suitable anionic surfactants for use in the cleaning composition can be a sulfate, a sulfosuccinate, a sulfoacetate, and/or a sulphonate; preferably an alkyl sulfate and/or an alkyl ethoxy sulfate; more preferably a combination of an alkyl sulfate and/or an alkyl ethoxy sulfate with a combined ethoxylation degree less than about 5, preferably less than about 3, more preferably less than about 2.

Sulphate or sulphonate surfactant is typically present at a level of at least about 5%, preferably from about 5% to about 40%, and more preferably from about 15% to about 30%, and even more preferably at about 15% to about 25% by weight of the cleaning composition.

Suitable sulphate or sulphonate surfactants for use in the cleaning composition include water-soluble salts or acids of $C_8$-$C_{14}$ alkyl or hydroxyalkyl, sulphate or sulphonates. Suitable counterions include hydrogen, alkali metal cation or ammonium or substituted ammonium, but preferably sodium. Where the hydrocarbyl chain is branched, it preferably comprises a $C_{1-4}$ alkyl branching unit. The average percentage branching of the sulphate or sulphonate surfactant is preferably greater than about 30%, more preferably from about 35% to about 80%, and most preferably from about 40% to about 60% of the total hydrocarbyl chain. One particularly suitable linear alkyl sulphonate includes $C_8$ sulphonate like Witconate NAS 8® commercially available from Witco.

The sulphate or sulphonate surfactants may be selected from a $C_{11}$-$C_{18}$ alkyl benzene sulphonate (LAS), a $C_8$-$C_{20}$ primary, a branched-chain and random alkyl sulphate (AS); a $C_{10}$-$C_{18}$ secondary (2,3) alkyl sulphate; a $C_{10}$-$C_{18}$ alkyl alkoxy sulphate ($AE_xS$) wherein preferably x is from 1-30; a $C_{10}$-$C_{18}$ alkyl alkoxy carboxylate preferably comprising about 1-5 ethoxy units; a mid-chain branched alkyl sulphate as discussed in U.S. Pat. Nos. 6,020,303, 6,060,443; a mid-chain branched alkyl alkoxy sulphate as discussed in U.S. Pat. Nos. 6,008,181 and 6,020,303; a modified alkylbenzene sulphonate (MLAS) as discussed in WO 99/05243, WO 99/05242, WO 99/05244, WO 99/05082, WO 99/05084, WO 99/05241, WO 99/07656, WO 00/23549, and WO 00/23548; a methyl ester sulphonate (MES); and an alpha-olefin sulphonate (AOS).

The paraffin sulphonate may be monosulphonate or disulphonate and usually are mixtures thereof, obtained by sulphonating a paraffin of about 10 to about 20 carbon atoms. Preferred sulphonates are those of $C_{12-18}$ carbon atoms chains and more preferably they are $C_{14-17}$ chains. Paraffin sulphonates that have the sulphonate group(s) distributed along the paraffin chain are described in U.S. Pat. Nos. 2,503,280; 2,507,088; 3,260,744; and 3,372,188.

Also suitable are the alkyl glyceryl sulphonate surfactant and/or alkyl glyceryl sulphate surfactant described in the Procter & Gamble patent application WO06/014740: A mixture of oligomeric alkyl glyceryl sulphonate and/or sulfate surfactant selected from a dimmer or a mixture thereof; a trimer or a mixture thereof; a tetramer or a mixture thereof; a pentamer or a mixture thereof; a hexamer or a mixture thereof; a heptamer or a mixture thereof; and mixtures thereof; wherein the alkyl glyceryl sulphonate and/or sulfate surfactant mixture comprises from about 0% to about 60% by weight of the monomers.

Other suitable anionic surfactants are alkyl, preferably dialkyl sulfosuccinate and/or sulfoacetate. The dialkyl sulfosuccinate may be a $C_{6-15}$ linear or branched dialkyl sulfosuccinate. The alkyl moiety may be symmetrical (i.e., the same alkyl moieties) or asymmetrical (i.e., different alkyl moieties). Preferably, the alkyl moiety is symmetrical.

Most common branched anionic alkyl ether sulphates are obtained via sulfation of a mixture of the branched alcohols and the branched alcohol ethoxylates. Also suitable are the sulfated fatty alcohols originating from the Fischer & Tropsh reaction comprising up to about 50% branching (about 40% methyl (mono or bi) about 10% cyclohexyl) such as those produced from the safol alcohols from Sasol; sulfated fatty alcohols originating from the oxo reaction wherein at least about 50% by weight of the alcohol is $C_2$ isomer (methyl to pentyl) such as those produced from the Isalchem® alcohols or Lial® alcohols from Sasol; the sulfated fatty alcohols originating from the modified oxo reaction wherein at least about 15% by weight of the alcohol is $C_2$ isomer (methyl to pentyl) such as those produced from the Neodol® alcohols from Shell.

Zwitterionic Surfactant and Amphoteric Surfactant

The zwitterionic and amphoteric surfactants for use in the cleaning composition can be comprised at a level of from about 0.01% to about 20%, preferably from about 0.2% to about 15%, more preferably from about 0.5% to about 10% by weight of the cleaning composition.

Suitable zwitterionic surfactant in the preferred embodiment wherein contains both basic and acidic groups which form an inner salt giving both cationic and anionic hydrophilic groups on the same molecule at a relatively wide range of pH's. The typical cationic group is a quaternary ammonium group, although other positively charged groups like phosphonium, imidazolium and sulfonium groups can be used. The typical anionic hydrophilic groups are carboxylate and sulphonate, although other groups like sulfate, phosphonate, and the like can be used.

The cleaning compositions may preferably further comprise an amine oxide and/or a betaine. Most preferred amine oxides are coconut dimethyl amine oxide or coconut amido propyl dimethyl amine oxide. Amine oxide may have a linear or mid-branched alkyl moiety. Typical linear amine oxides include water-soluble amine oxide containing one $R^4$ $C_{8-18}$ alkyl moiety and 2 $R^5$ and $R^8$ moieties selected from the group consisting of a $C_{1-3}$ alkyl group and a mixtures thereof; and a $C_{1-3}$ hydroxyalkyl group and a mixture thereof. Preferably amine oxide is characterized by the formula $R^4$—$N(R^5)(R^8)$→40 wherein $R^4$ is a $C_{8-18}$ alkyl and $R^5$ and $R^8$ are selected from the group consisting of a methyl; an ethyl; a propyl; an isopropyl; a 2-hydroxethyl; a 2-hydroxypropyl; and a 3-hydroxypropyl. The linear amine oxide surfactant, in particular, may include a linear $C_{10}$-$C_{18}$ alkyl dimethyl amine oxide and a linear $C_8$-$C_{12}$ alkoxy ethyl dihydroxy ethyl amine oxide. Preferred amine oxides include linear $C_{10}$, linear $C_{10}$-$C_{12}$, and linear $C_{12}$-$C_{14}$ alkyl dimethyl amine oxides.

As used herein "mid-branched" means that the amine oxide has one alkyl moiety having $n_1$ carbon atoms with one alkyl branch on the alkyl moiety having $n_2$ carbon atoms. The alkyl branch is located on the α carbon from the nitrogen on the alkyl moiety. This type of branching for the amine oxide is also known in the art as an internal amine oxide. The total sum of $n_1$ and $n_2$ is from about 10 to about 24 carbon atoms, preferably from about 12 to about 20, and more preferably from about 10 to about 16. The number of carbon atoms for the one alkyl moiety ($n_1$) should be approximately the same number of carbon atoms as the one alkyl branch ($n_2$) such that the one alkyl moiety and the one alkyl branch are symmetric. As used herein, "symmetric" means that $|n_1-n_2|$ is less than or equal to about 5, preferably about 4, most preferably from about 0 to about 4 carbon atoms in at least about 50 wt %, more preferably at least about 75 wt % to about 100 wt % of the mid-branched amine oxide for use herein.

The amine oxide further comprises two moieties, independently selected from a $C_{1-3}$ alkyl; a $C_{1-3}$ hydroxyalkyl group; or a polyethylene oxide group containing an average of from about 1 to about 3 ethylene oxide groups. Preferably the two moieties are selected from a $C_{1-3}$ alkyl, more preferably both are selected as a $C_1$ alkyl.

Other suitable surfactants include a betaine such an alkyl betaine, an alkylamidobetaine, an amidazoliniumbetaine, a sulfobetaine (INCI Sultaines), as well as a phosphobetaine, and preferably meets formula V:

$R^{1'}$-[CO-X $(CH_2)_j]_g$—$N^+(R^{2'})(R^{3'})$-$(CH_2)_f$—[CH(OH)—$CH_2]_h$-Y-     (Formula V)

wherein
$R^{1'}$ is a saturated or unsaturated $C_{6-22}$ alkyl residue, preferably a $C_{8-18}$ alkyl residue, in particular a saturated $C_{10-16}$ alkyl residue, for example a saturated $C_{12-14}$ alkyl residue;

X is NH, $NR^{4'}$ with $C_{1-4}$ alkyl residue $R^{4'}$, O or S, j is a number from about 1 to about 10, preferably from about 2 to about 5, in particular about 3, g is about 0 or about 1, preferably about 1, $R^{2'}$, $R^{3'}$ are independently a $C_{1-4}$ alkyl residue, potentially hydroxy substituted by such as a hydroxyethyl, preferably by a methyl.

f is a number from about 1 to about 4, in particular about 1, 2 or 3, h is about 0 or 1, and Y is selected from COO, $SO_3$, $OPO(OR^{5'})O$ or $P(O)(OR^{5'})O$, whereby $R^{5'}$ is a hydrogen atom H or a $C_{1-4}$ alkyl residue.

Preferred betaines are the alkyl betaine of the formula ($V_a$), the alkyl amido betaine of the formula ($V_b$), the sulfo betaine of the formula ($V_c$), and the Amido sulfobetaine of the formula ($V_d$);

    ($V_a$)

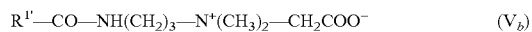    ($V_b$)

R¹'—N⁺(CH₃)₂—CH₂CH(OH)CH₂SO₃— (V_c)

R¹'—CO—NH—(CH₂)₃—N⁺(CH₃)₂—CH₂CH(OH)CH₂SO₃⁻ (V_d)

in which R¹' has the same meaning as in formula V. Particularly preferred betaines are the carbobetaine, wherein Y⁻ is [COO⁻], in particular the carbobetaine of formula (V_a) and (V_b), more preferred are the alkylamidobetaine of the formula (V_b).

Examples of suitable betaines and sulfobetaines are the following (designated in accordance with INCI): almondamidopropyl of betaine, apricotamidopropyl betaine, avocadamidopropyl of betaine, babassuamidopropyl of betaine, behenamidopropyl betaine, behenyl of betaine, betaine, canolamidopropyl betaine, capryl/capramidopropyl betaine, carnitine, cetyl of betaine, cocamidoethyl of betaine, cocamidopropyl betaine, cocamidopropyl hydroxysultaine, coco betaine, coco hydroxysultaine, coco/oleamidopropyl betaine, coco sultaine, decyl of betaine, dihydroxyethyl oleyl glycinate, dihydroxyethyl soy glycinate, dihydroxyethyl stearyl glycinate, dihydroxyethyl tallow glycinate, dimethicone propyl of PG-betaine, drucamidopropyl hydroxysultaine, hydrogenated tallow of betaine, isostearamidopropyl betaine, lauramidopropyl betaine, lauryl of betaine, lauryl hydroxysultaine, lauryl sultaine, milk amidopropyl betaine, milkamidopropyl of betaine, myristamidopropyl betaine, myristyl of betaine, oleamidopropyl betaine, oleamidopropyl hydroxysultaine, oleyl of betaine, olivamidopropyl of betaine, palmamidopropyl betaine, palmitamidopropyl betaine, palmitoyl carnitine, palm kernel amidopropyl betaine, polytetrafluoroethylene acetoxypropyl of betaine, ricinoleamidopropyl betaine, sesamidopropyl betaine, soyamidopropyl betaine, stearamidopropyl betaine, stearyl of betaine, tallowamidopropyl betaine, tallowamidopropyl hydroxysultaine, tallow of betaine, tallow dihydroxyethyl of betaine, undecylenamidopropyl betaine and wheat germ amidopropyl betaine. Preferred betaine is for example cocoamidopropyl betaine.

For example coconut dimethyl betaine is commercially available from Seppic under the trade name of Amonyl 265®. Lauryl betaine is commercially available from Albright & Wilson under the trade name Empigen BB/L®. A further example of betaine is lauryl-imino-dipropionate commercially available from Rhodia under the trade name Mirataine H2C-HA®.

One particularly preferred zwitterionic surfactants for use in the preferred embodiment wherein the composition is a hard surface cleaning composition is the sulfobetaine surfactant, because it delivers optimum soap scum cleaning benefits.

Examples of particularly suitable sulfobetaine surfactants include tallow bis(hydroxyethyl) sulphobetaine and cocoamido propyl hydroxy sulphobetaine which are commercially available from Rhodia and Witco, under the trade name of Mirataine CBS® and Rewoteric AM CAS 15® respectively.

Cationic Surfactant

In one preferred embodiment, the cleaning composition can comprise a cationic surfactant present in an effective amount, more preferably from about 0.1% to about 20%, by weight of the liquid cleaning composition. Suitable cationic surfactant is quaternary ammonium surfactant. Suitable quaternary ammonium surfactant is selected from the group consisting of a mono $C_6$-$C_{16}$, preferably a $C_6$-$C_{10}$ N-alkyl or an alkenyl ammonium surfactant or a mixture thereof, wherein the remaining N positions are substituted by a methyl, a hydroxyethyl or a hydroxypropyl group. Another preferred cationic surfactant is a $C_6$-$C_{18}$ alkyl or alkenyl ester of a quaternary ammonium alcohol, such as quaternary chlorine ester. More preferably, the cationic surfactant has formula (VI):

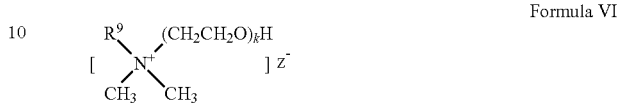

Formula VI wherein $R^9$ of formula (VI) is a $C_8$-$C_{18}$ hydrocarbyl or a mixture thereof, preferably, a $C_{8-14}$ alkyl, more preferably, a $C_8$, $C_{10}$ or $C_{12}$ alkyl; and Z of formula (VI) is an anion, preferably, a chloride or a bromide.

Optional Ingredients

The cleaning composition according to the present invention may comprise a variety of optional ingredients depending on the technical benefit aimed for and the surfaces treated.

Suitable optional ingredients for use herein include an alkaline material or a mixture thereof; an inorganic or organic acid and salt thereof or a mixture thereof; a buffering agent or a mixture thereof; a surface modifying polymer or a mixture thereof; a cleaning polymer or a mixture thereof; a peroxygen bleach or a mixture thereof; a radical scavenger or a mixture thereof; a chelating agent or a mixture thereof; a perfume or a mixture thereof; a dye or a mixture thereof; a hydrotrope or a mixture thereof; a polymeric suds stabilizer or a mixture thereof; a diamine or a mixture thereof; and mixtures thereof.

Solvent

Solvents are generally used to ensure preferred product quality for dissolution, thickness and aesthetics and to ensure better processing. The cleaning composition of the present invention may further comprise a solvent or a mixture thereof, as an optional ingredient. Typically, in the preferred embodiment wherein the composition is a hard surface cleaning composition, the composition may comprise from about 0.1% to about 10%, preferably from about 0.5% to about 5%, and more preferably from about 1% to about 3% by weight of the total composition of a solvent or a mixture thereof. In the preferred embodiment wherein the composition is a hand dishwashing detergent composition, the composition contains from about 0.01% to about 20%, preferably from about 0.5% to about 20%, more preferably from about 1% to about 10% by weight of a solvent.

Suitable solvents herein include $C_1$-$C_5$ alcohols according to the formula $R^{10}$-OH wherein $R^{10}$ is a saturated alkyl group of from about 1 to about 5 carbon atoms, preferably from about 2 to about 4. Suitable alcohols are ethanol, propanol, isopropanol or mixtures thereof. Other suitable alcohols are alkoxylated $C_{1-8}$ alcohols according to the formula $R^{11}$-$(A_q)$—OH wherein $R^{11}$ is a alkyl group of from about 1 to about 8 carbon atoms, preferably from about 3 to about 6, and wherein A is an alkoxy group, preferably propoxy and/or ethoxy, and q is an integer of from 1 to 5, preferably from 1 to 2. Suitable alcohols are butoxy propoxy propanol (n-BPP), butoxy propanol (n-BP), butoxyethanol, or mixtures thereof. Suitable alkoxylated aromatic alcohols to be used herein are those according to the formula $R^{12}$-$(B)_r$—OH wherein $R^{12}$ is an alkyl substituted or non-alkyl substituted aryl group of from about 1 to about 20 carbon atoms, preferably from about 2 to about 15, and more preferably from about 2 to about 10, wherein B is an alkoxy group, preferably a butoxy, propoxy and/or ethoxy, and r is an integer of from 1 to 5, preferably from 1 to 2. A suitable aromatic alcohol to be used herein is benzyl alcohol. Suitable alkoxylated aromatic alcohol is benzylethanol and or benzylpropanol. Other suitable solvent includes butyl diglycolether, benzylalcohol, propoxypropoxypropanol (EP 0 859 044) ether and diether, glycol, alkoxylated glycol, $C_6$-$C_{16}$ glycol ether, alkoxylated aromatic alcohol, aromatic alcohol, aliphatic branched alcohol, alkoxylated aliphatic branched alcohol, alkoxylated linear $C_1$-$C_5$ alcohol, linear $C_1$-$C_5$ alcohol, amine, $C_8$-$C_{14}$ alkyl and cycloalkyl hydrocarbon and halohydrocarbon, and mixtures thereof.

Perfume

The cleaning composition of the present invention may comprise a perfume ingredient, or mixtures thereof, in amount up to about 5.0% by weight of the total composition, preferably in amount of about 0.1% to about 1.5%. Suitable perfume compounds and compositions for use herein are for example those described in EP-A-0 957 156 under the paragraph entitled "Perfume", on page 13.

Dye

The cleaning composition according to the present invention may be colored. Accordingly, it may comprise a dye or a mixture thereof. Suitable dyes for use herein are chemically and physically stable at the pH of the composition herein.

pH Adjustment Agent

Alkaline Material

Preferably, an alkaline material may be present to trim the pH and/or maintain the pH of the composition according to the present invention. The amount of alkaline material is from about 0.001% to about 20%, preferably from about 0.01% to about 10%, and more preferably from about 0.05% to about 3% by weight of the composition.

Examples of the alkaline material are sodium hydroxide, potassium hydroxide and/or lithium hydroxide, and/or the alkali metal oxide, such as sodium and/or potassium oxide, or mixtures thereof. Preferably, the source of alkalinity is sodium hydroxide or potassium hydroxide, preferably sodium hydroxide.

Acid

The cleaning composition of the present invention may comprise an acid. Any acid known to those skilled in the art may be used herein. Typically the composition herein may comprise up to about 20%, preferably from about 0.1% to about 10%, more preferably from about 0.1% to about 5%, even more preferably from about 0.1% to about 3%, by weight of the total composition of an acid.

Suitable acids are selected from the group consisting of a mono- and poly-carboxylic acid or a mixture thereof; a percarboxylic acid or a mixture thereof; a substituted carboxylic acid or a mixture thereof; and mixtures thereof. Carboxylic acids useful herein include $C_{1-6}$ linear or at least about 3 carbon containing cyclic acids. The linear or cyclic carbon-containing chain of the carboxylic acid may be substituted with a substituent group selected from the group consisting of hydroxyl, ester, ether, aliphatic groups having from about 1 to about 6, more preferably from about 1 to about 4 carbon atoms, and mixtures thereof.

Suitable mono- and poly-carboxylic acids are selected from the group consisting of citric acid, lactic acid, ascorbic acid, isoascorbic acid, tartaric acid, formic acid, maleic acid, malic acid, malonic acid, propionic acid, acetic acid, dehydroacetic acid, benzoic acid, hydroxy benzoic acid, and mixtures thereof.

Suitable percarboxylic acids are selected from the group consisting of peracetic acid, percarbonic acid, perboric acid, and mixtures thereof.

Suitable substituted carboxylic acids are selected from the group consisting of an amino acid or a mixture thereof; a halogenated carboxylic acid or a mixture thereof; and mixtures thereof.

Preferred acids for use herein are selected from the group consisting of lactic acid, citric acid, and ascorbic acid and mixtures thereof. More preferred acids for use herein are selected from the group consisting of lactic acid and citric acid and mixtures thereof. An even more preferred acid for use herein is lactic acid.

Suitable acids are commercially available from JBL, T&L, or Sigma. Lactic acid is commercially available from Sigma and Purac.

Salt

In a preferred embodiment, the cleaning composition of the present invention also comprises other salts as the pH buffer. Salts are generally present at an active level of from about 0.01% to about 5%, preferably from about 0.015% to about 3%, more preferably from about 0.025% to about 2.0%, by weight of the composition.

When salts are included, the ions can be selected from magnesium, sodium, potassium, calcium, and/or magnesium, and preferably from sodium and magnesium, and are added as a hydroxide, chloride, acetate, sulphate, formate, oxide or nitrate salt to the composition of the present invention.

Chelant

In a preferred embodiment, the composition of the present invention may comprise a chelant at a level of from about 0.1% to about 20%, preferably from about 0.2% to about 5%, more preferably from about 0.2% to about 3% by weight of total composition.

Suitable chelants can be selected from the group consisting of an amino carboxylate or a mixture thereof; an amino phosphonate or a mixture thereof; a polyfunctionally-substituted aromatic chelant or a mixture thereof; and mixtures thereof.

Preferred chelants for use herein are the amino acid based chelants, and preferably glutamic-N,N-diacetic acid (GLDA) and derivatives, and/or phosphonate based chelants, and preferably diethylenetriamine pentamethylphosphonic acid. GLDA (salts and derivatives thereof) is especially preferred according to the invention, with the tetrasodium salt thereof being especially preferred.

Also preferred are amino carboxylates including ethylenediaminetetra-acetate, N-hydroxyethylethylenediaminetriacetate, nitrilo-triacetate, ethylenediamine tetrapro-prionate, triethylenetetraaminehexacetate, diethylenetriaminepentaacetate, ethanoldi-glycine; and alkali metal, ammonium, and substituted ammonium salts thereof; and mixtures thereof; as well as MGDA (methyl-glycine-diacetic acid), and salts and derivatives thereof;

Other chelants include homopolymers and copolymers of polycarboxylic acids and their partially or completely neutralized salts, monomeric polycarboxylic acids and hydroxycarboxylic acids and their salts. Preferred salts of the above-mentioned compounds are the ammonium and/or alkali metal salts, i.e. the lithium, sodium, and potassium salts, and particularly preferred salts are the sodium salts.

Suitable polycarboxylic acids are acyclic, alicyclic, heterocyclic and aromatic carboxylic acids, in which case they contain at least about two carboxyl groups which are in each case separated from one another by, preferably, no more than about two carbon atoms. Polycarboxylates which comprise two carboxyl groups include, for example, water-soluble salts of, malonic acid, (ethyl enedioxy) diacetic acid, maleic acid, diglycolic acid, tartaric acid, tartronic acid and fumaric acid. Polycarboxylates which contain three carboxyl groups include, for example, water-soluble citrate. Correspondingly, a suitable hydroxycarboxylic acid is, for example, citric acid. Another suitable polycarboxylic acid is the homopolymer of acrylic acid. Preferred are the polycarboxylates end capped with sulphonates.

Further suitable polycarboxylates chelants for use herein include acetic acid, succinic acid, formic acid; all preferably in the form of a water-soluble salt. Other suitable polycarboxylates are oxodisuccinates, carboxymethyloxysuccinate and mixtures of tartrate monosuccinic and tartrate disuccinic acid such as described in U.S. Pat. No. 4,663,071.

Amino phosphonates are also suitable for use as chelant and include ethylenediaminetetrakis (methylenephosphonates) as DEQUEST. Preferably, these amino phosphonates do not contain alkyl or alkenyl groups with more than about 6 carbon atoms. Polyfunctionally-substituted aromatic chelants are also useful in the composition herein, such as described in U.S. Pat. No. 3,812,044. Preferred compounds of this type in acid form are dihydroxydisulfobenzenes such as 1,2-dihydroxy-3,5-disulfobenzene.

Hydrotrope

The cleaning composition of the present invention may optionally comprise a hydrotrope in an effective amount so that the composition is appropriately compatible in water. The composition of the present invention typically comprises from about 0% to about 15% by weight of the total composition of a hydrotropic, or mixtures thereof, preferably from about 1% to about 10%, most preferably from about 3% to about 6%. Suitable hydrotropes for use herein include anionic-type hydrotropes, particularly sodium, potassium, and ammonium xylene sulphonate, sodium, potassium and ammonium toluene sulphonate, sodium potassium and ammonium cumene sulphonate, and mixtures thereof, and related compounds, as disclosed in U.S. Pat. No. 3,915,903.

Methods of Use

In the method aspect of this invention, soiled dishes are contacted with an effective amount, typically from about 0.5 ml to about 20 ml (per 25 dishes being treated), preferably from about 3 ml to about 10 ml, of the cleaning composition of the present invention diluted in water. The actual amount of liquid detergent composition used will be based on the judgment of user, and will typically depend upon factors such as the particular product formulation of the composition, including the concentration of active ingredients in the composition, the number of soiled dishes to be cleaned, the degree of soiling on the dishes, and the like. The particular product formulation, in turn, will depend upon a number of factors, such as the intended market (i.e., U.S., Europe, Japan, etc.) for the composition product. Suitable examples may be seen in the Example compositions below.

Generally, from about 0.01 ml to about 150 ml, preferably from about 3 ml to about 40 ml of a liquid detergent composition of the invention is combined with from about 2000 ml to about 20000 ml, more typically from about 5000 ml to about 15000 ml of water in a sink having a volumetric capacity in the range of from about 1000 ml to about 20000 ml, more typically from about 5000 ml to about 15000 ml. The soiled dishes are immersed in the sink containing the diluted compositions then obtained, where contacting the soiled surface of the dish with a cloth, sponge, or similar article cleans them. The cloth, sponge, or similar article may be immersed in the detergent composition and water mixture prior to being contacted with the dish surface, and is typically contacted with the dish surface for a period of time ranged from about 1 to about 10 seconds, although the actual time will vary with each application and user. The contacting of cloth, sponge, or similar article to the dish surface is preferably accompanied by a concurrent scrubbing of the dish surface.

Another method of use will comprise immersing the soiled dishes into a water bath or held under running water without any liquid dishwashing detergent. A device for absorbing liquid dishwashing detergent, such as a sponge, is placed directly into a separate quantity of undiluted liquid dishwashing composition for a period of time typically ranging from about 1 to about 5 seconds. The absorbing device, and consequently the undiluted liquid dishwashing composition, is then contacted individually to the surface of each of the soiled dishes to remove said soiling. The absorbing device is typically contacted with each dish surface for a period of time range from about 1 to about 10 seconds, although the actual time of application will be dependent upon factors such as the degree of soiling of the dish. The contacting of the absorbing device to the dish surface is preferably accompanied by concurrent scrubbing.

Liquid hard surface cleaning compositions of the present invention, are suitable for cleaning household surfaces. For general cleaning, especially of floors, the preferred method of cleaning comprises the steps of:
  a) diluting a liquid hard surface cleaning composition of the present invention to a dilution level of from 0.1% to 2% by volume, and
  b) applying the diluted composition to a hard surface.

In preferred embodiments, the liquid hard surface cleaning composition may be diluted to a level of from 0.3% to 1.5% by volume. The liquid hard surface cleaning composition may be diluted to a level of from 0.4% to 0.6% by volume. In preferred embodiments, the liquid hard surface cleaning composition is diluted with water.

The dilution level is expressed as a percent defined as the fraction of the liquid hard surface cleaning composition, by volume, with respect to the total amount of the diluted composition. For example, a dilution level of 5% by volume is equivalent to 50 ml of the liquid hard surface cleaning composition being diluted to form 1000 ml of diluted composition.

The diluted composition can be applied by any suitable means, including using a mop, sponge, or other suitable implement.

The hard surface may be rinsed, preferably with clean water, in an optional further step. Alternatively, the liquid hard surface cleaning compositions of the present invention, can be applied neat to the hard surface.

By "neat", it is to be understood that the liquid composition is applied directly onto the surface to be treated without undergoing any significant dilution, i.e., the liquid composition herein is applied onto the hard surface as described herein, either directly or via an implement such as a sponge, without first diluting the composition. By significant dilution, what is meant is that the composition is diluted by less than 10 wt %, preferably less than 5 wt %, more preferably less than 3 wt %. Such dilutions can arise from the use of damp implements to apply the composition to the hard surface, such as sponges which have been "squeezed" dry.

In a preferred embodiment of the present invention said hard surface is inclined or vertical. Inclined or vertical hard surfaces include mirrors, lavatory pans, urinals, drains, waste pipes and the like.

In another preferred embodiment of the present invention said method of cleaning a hard surface includes the steps of applying, preferably spraying, said liquid composition onto said hard surface, leaving said liquid composition to act onto said surface for a period of time to allow said composition to act, with or without applying mechanical action, and optionally removing said liquid composition, preferably removing said liquid composition by rinsing said hard surface with water and/or wiping said hard surface with an appropriate instrument, e.g., a sponge, a paper or cloth towel and the like.

Analytical Methods

Amine Number

The Amine Number was determined according to DIN 16945 by titratation of a solution of the polymer in acetic acid with perchloric acid.

Hydroxy Number

The Hydroxy number was determined according to DIN 53240 by heating the sample in pyridine with acetic acid anhydride and acetic acid, followed by titration with potassium hydroxide.

Number Average Molecular Weight

The Molecular weight (Mn) was determined by size exclusion chromatography with hexafluoroisopropanol as eluent.

Viscosity

The viscosity of the pure polymers was measured with a rotary viscometer (Haake) at 20° C.

EXAMPLES

In the following examples, "/mol OH" means per mol of free OH-groups in the polymer (polytriethanolamine in the following examples).

In the following examples, "EO" means Ethylene Oxide and "PO" means Propylene Oxide.

Example 1a

Polytriethanolamine (Condensation According to Step a)

A four-neck flask equipped with stirrer, distillation bridge, gas inlet tube, and internal thermometer is charged with 1500 g triethanolamine and 20 g of a 50% by weight aqueous solution of $H_3PO_2$. The mixture is heated under nitrogen to 200° C. The reaction mixture is stirred at 200° C. over a period of 15.5 hours, during which the condensate formed in the reaction is removed by means of a moderate stream of $N_2$ as stripping gas via the distillation bridge. Toward the end of the reaction time indicated, the temperature is lowered to 140° C. Residual low molecular weight products are removed under a pressure of 100 mbar. Then, the reaction mixture is cooled to ambient temperature, and polytriethanolamine (OH number: 585 mg KOH/g, amine number: 423 mg KOH/g, dynamic viscosity at 60° C.: 431 mPas, Mn=4450 g/mol, Mw=8200 g/mol) is obtained.

Example 1b

Polytriethanolamine+20 EO/OH

A 1 l autoclave is charged with 66.0 g polytriethanolamine with a hydroxy number of 585.0 mgKOH/g obtained in a process as described in example 1 a), and 2.7 g potassium hydroxide (50% aqueous solution). The mixture is stirred under vacuum (<10 mbar) at 120° C. for 2 h. The autoclave is purged with nitrogen and heated to 140° C. 605.6 g ethylene oxide is added within 6 h. To complete the reaction, the mixture is allowed to post-react for additional 10 h at 140° C. The reaction mixture is stripped with nitrogen and volatile compounds are removed in vacuo at 80° C. 653.0 g of a light brown solid is obtained (hydroxy number: 68.0 mgKOH/g).

Example 1c

Polytriethanolamine+19 EO/OH

A 1 l autoclave is charged with 117.1 g polytriethanolamine with a hydroxy number of 580.0 mgKOH/g obtained from a process as described in example 1 a) and 4.7 g potassium hydroxide (50% aqueous solution). The mixture is stirred under vacuum (<10 mbar) at 120° C. for 2 h. The autoclave is purged with nitrogen and heated to 140° C. 1065.6 g ethylene oxide is added within 10 h. To complete the reaction, the mixture is allowed to post-react for additional 10 h at 140° C. The reaction mixture is stripped with nitrogen and volatile compounds are removed in vacuo at 80° C. 1136.0 g of a light brown solid is obtained (hydroxy number: 66.4 mgKOH/g).

Example 2a

Polytriethanolamine

A polytriethanolamine is prepared as described in example 1a) and obtained as a light brown liquid (hydroxy number: 595.0 mgKOH/g).

Example 2b

Polytriethanolamine+16 PO/OH

A 1 l autoclave is charged with 61.6 g polytriethanolamine from example 2 a) and 2.8 g potassium hydroxide (50% aqueous solution). The mixture is stirred under vacuum (<10 mbar) at 120° C. for 2 h. The autoclave is purged with nitrogen and heated to 140° C. 606.2 g propylene oxide is added within 6 h. To complete the reaction, the mixture is allowed to post-react for additional 10 h at 140° C. The reaction mixture is stripped with nitrogen and volatile compounds are removed in vacuo at 80° C. 666.5 g of a light brown liquid is obtained (hydroxy number: 73.1 mgKOH/g).

Example 2c

Polytriethanolamine+24 EO/OH+16 PO/OH

A 1 l autoclave is charged with 56.5 g polytriethanolamine from example 2 a) and 5.0 g potassium hydroxide (50% aqueous solution). The mixture is stirred under vacuum (<10 mbar) at 120° C. for 2 h. The autoclave is purged with nitrogen and heated to 140° C. 632.7 g ethylene oxide is added within 6 h. The mixture is stirred 5 h at 140° C., followed by the addition of 556.0 g propylene oxide within 5 h. To complete the reaction, the mixture is allowed to post-react for additional 10 h at 140° C. The reaction mixture is stripped with nitrogen and volatile compounds are removed in vacuo at 80° C. 1254.0 g of a light brown liquid is obtained (hydroxy number: 41.5 mgKOH/g, amine number: 20.8 mgKOH/g).

Evaluation of Cleaning Performance
Preparation of Burnt-on Grease:

Commercially available vegetable oils are mixed together with albumin (commercially available from Sigma Aldrich) in a ratio of 80 to 20 (w/w) and a heat resistant red dye is added. The mixture is homogenously distributed on an enamel plate and the plate is baked at 165° C. for 2.5-3 hours.

Test Procedure:

The prepared enamel plates are placed into a wet abrasion scrub tester (Sheen Instruments). Four Sponges are placed into the scrub tester and are treated with 25 mL of a test solution of 10% w/w of a detergent composition as detailed below in table 1 together with 90% w/w water. Hardness of the test solutions is adjusted to 2.5 mM of $Ca^{2+}/Mg^{2+}$ (ratio 3:1) and the pH to 9.0. A photo is taken after every wipe. The amount of residual grease on the enamel plate is quantified via image analysis of the photo.

The following hand dishwashing detergent compositions are made (table 1):

TABLE 1

| Ingredients | Reference composition A | Composition B |
|---|---|---|
| AES | 21.41 | 21.41 |
| C12/14 dimethyl amineoxide | 4.86 | 4.86 |
| Nonionic surfactant | 0.43 | 0.43 |
| PPG 2000 | 0.40 | 0.40 |
| Ethanol | 2.36 | 2.36 |
| NaCl | 0.80 | 0.80 |
| Phenoxyethanol | 0.15 | 0.15 |
| PEI polymer | 0.25 | 0.25 |
| Additive | — | 5.0 |

Dye, perfume and preservative
NaOH/HCl to pH 9 (10% in demin water)
Water to 100%
Numbers in weight % of the formula AES is $C_{13-15}$ ethoxylated sulfate with 0.6 average ethoxylation.
PPG 2000 is polypropylene glycol (Molecular Weight 2000)
Nonionic surfactant is a C9-C11 E08
PEI polymer is an alkoxylated polyethyleneimine polymer with a number average molecular weight of about 14,000 g/mol Cleaning performance for solutions with additive (composition B as defined in table 1) are reported after 10 wipes in percentage vs. the cleaning observed for the solution without additive (reference composition A as defined in table 1). The results are shown in tables 2 and 3. Only results within the same cleaning test are compared.

| Additive according to | cleaning index vs. nil, after 10 strokes | | | | |
|---|---|---|---|---|---|
| Table 1 | exp 1 | exp 2 | exp 3 | exp 4 | average |
| no additive (= composition A) | 100 | 100 | 100 | 100 | 100 |
| Example 1a) | 255 | 277 | 252 | 234 | 254 |
| Example 1b) | 116 | 97 | 135 | 94 | 110 |
| Example 1c) | 101 | 111 | 124 | 98 | 108 |

| Additive according to | cleaning index vs. nil, after 10 strokes | | | | |
|---|---|---|---|---|---|
| Table 1 | exp 1 | exp 2 | exp 3 | exp 4 | average |
| no additive (= composition A) | 100 | 100 | 100 | 100 | 100 |
| Example 2a) | 292 | 285 | 367 | 277 | 305 |
| Example 2b) | 90 | 90 | 103 | 123 | 101 |
| Example 2c) | 92 | 87 | 101 | 150 | 108 |

The results, as presented in table 2 and 3 prove that compositions comprising an additive according to the present invention (examples 1a and 2a) are superior over compositions without an additive (composition A) and compositions containing an additive not according to the invention (examples 1b, 1c, 2b, 2c). This demonstrates the properties of the selected chemical structure of the inventive polymer, if used as an additive, to be causal for the observed improved cleaning performance of the dishwashing composition.

TABLE 4

| Liquid Dish Handwashing Detergents | | |
|---|---|---|
| Composition | A | B |
| $C_{12-13}$ Natural AE0.6S | 29.0 | 29.0 |
| $C_{10-14}$ mid-branched Amine Oxide | — | 6.0 |
| $C_{12-14}$ Linear Amine Oxide | 6.0 | — |
| SAFOL ® 23 Amine Oxide | 1.0 | 1.0 |
| Nonionic surfactant [1] | 2.0 | 2.0 |
| Ethanol | 4.5 | 4.5 |
| Polymer example 1a | 5.0 | 2.0 |
| Sodium cumene sulfonate | 1.6 | 1.6 |
| Polypropylene glycol 2000 | 0.8 | 0.8 |
| NaCl | 0.8 | 0.8 |
| Suds boosting polymer[2] | 0.2 | 0.2 |
| Water | Balance | Balance |

[1] Nonionic surfactant is a $C_{11}$ Alkyl ethoxylated surfactant containing 9 ethoxy groups
[2] (N,N-dimethylamino)ethyl methacrylate homopolymer Other Cleaning Composition Examples The following additional examples will further illustrate the present invention. The compositions are made by combining the listed ingredients in the listed proportions (weight % unless otherwise specified). The following Examples are meant to exemplify compositions used in a process according to the present invention but are not necessarily used to limit or otherwise define the scope of the present invention.

TABLE 5

Other Suitable Cleaning Compositions

| | A | B | C | D | E | F | G | H | I |
|---|---|---|---|---|---|---|---|---|---|
| Non ionic | | | | | | | | | |
| C9/11 EO8 | 6.0 | 6.0 | 7.0 | | | 6.0 | 6.0 | 6.0 | 6.2 |
| C9/11 EO5 | | | | 3.5 | | | | | |
| C12/14 EO21 | | | | 3.5 | | | | | |
| C11 EO5 | | | | | 7.0 | | | | |
| Anionic | | | | | | | | | |
| NaLAS | 2.00 | 2.25 | 1.8 | | | | 1.80 | 2.25 | 1.80 |
| NAPS | | | | 3.1 | 3.0 | 3.0 | | | 3.1 |
| Co surfactants | | | | | | | | | |
| C12-14 AO | 1.50 | 1.25 | 1.50 | 3.9 | 2.0 | | 1.50 | 1.25 | 1.50 |
| C12-14 Betaine | | | | | 1.0 | 3.0 | | | |
| Polymer of the invention | | | | | | | | | |
| Example 1a/2a | 0.15 | 0.50 | 1.0 | 1.5 | 2.0 | 0.15 | 0.5 | 1.5 | 0.3 |
| Thickeners | | | | | | | | | |
| Polyacrylate | 0.76 | 0.65 | 0.75 | | | | 0.70 | 0.65 | 0.65 |
| HM-HEC | | | | 0.6 | 0.8 | | | | |
| Xantham gum | | | | | | 0.42 | | | |
| Buffer | | | | | | | | | |
| Na2CO3 | 0.77 | 0.4 | 0.75 | 0.1 | 0.3 | 0.2 | 0.75 | 0.4 | 0.75 |
| Citric Acid | 0.046 | 0.3 | 0.3 | 0.75 | 0.75 | 0.3 | 0.3 | 0.3 | 0.30 |
| Na Hydroxide | 0.46 | 0.76 | 0.72 | 0.5 | 0.5 | 0.3 | 0.65 | 0.65 | 0.60 |
| Suds control | | | | | | | | | |
| Fatty Acid | 0.40 | 1.0 | 1.0 | 0.20 | 0.50 | 0.50 | 0.40 | 0.40 | 1.0 |
| Branched fatty alcohols | | | | | | | | | |
| Isofol 12 | | 0.2 | 0.1 | 0.2 | 0.3 | 0.5 | | | 0.1 |
| Isofol 16 | | | | | | | | | |
| Chelants | | | | | | | | | |
| DTPMP | | 0.3 | 0.30 | | | 0.2 | | | 0.3 |
| MGDA | 0.25 | | | | | | 0.25 | | |
| GLDA | | | 0.25 | | | | | 0.25 | |
| Solvents | | | | | | | | | |
| Isopropanol | | | | | | 2.0 | | | |
| n-BPPP | | | | | 2.0 | | | | |
| N-BP | | | | 4.0 | 2.0 | | | 2.0 | |
| Minors and Water balance up to 100% | | | | | | | | | |
| pH | 10.6 | 10.5 | 10.3 | 9.5 | 9.0 | 10.0 | 10.3 | 10.5 | 10.3 |

$C_{9-11}$ EO8, $C_{9-11}$ EO5, $C_{12-14}$ EO21 and $C_{11}$ EO5 are nonionic surfactants commercially available from ICI or Shell, Huls, A&W or Hoechst.
NaPS is Sodium Paraffin sulphonate commercially available from Huls or Hoechst.
NaLAS is Sodium Linear Alkylbenzene sulphonate commercially available from A&W.
NaCS is Sodium Cumene sulphonate commercially available from A&W.
Isalchem ® AS is a $C_{12-13}$ sulphate surfactant commercially available from Sasol olefins and surfactants.
$C_{12-14}$ AO is a $C_{12-14}$ amine oxide surfactant.
$C_{12-14}$ Betaine is a $C_{12-14}$ betaine surfactant.
HM-HEC is a cetylhydroxethylcellulose.
Isofol 12 ® is 2-butyl octanol commercially available from Condea.
Isofol 16 ® is 2-hexyl decanol commercially available from Condea.
DTPMP is diethylenetriamine penta(methylene phosphonic acid) sodium salt available as Dequest ®
MGDA is methylglycinediacetic acid available as Trilon M from BASF.
GLDA is tetrasodium salt of glutamic diacetic acid available as Dissolvine ® from AkzoNobel.
n-BP is normal butoxy propanol commercially available from Dow Chemicals.
n-BPP is butoxy propoxy propanol available from Dow Chemicals.

Unless otherwise noted, all component or composition levels are in reference to the active level of that component or composition, and are exclusive of impurities, for example, residual solvents or by-products, which may be present in commercially available sources.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cleaning composition which comprises a surfactant system and a polyalkanolamine polymer obtained by a process comprising step a), wherein
   a) condensing component a1), which is triethanolamine, wherein the sum of the amount of a1) is 100 wt. % in relation to the sum of the amount of all monomers employed in the condensation according to step a) in order to obtain a polyether having remaining hydroxyl groups and optionally remaining secondary amino groups, wherein the condensation in step a) occurs in the presence of 0.1% to 1% by weight of phosphoric acid at a temperature of from 180 to 240° C., wherein the condensation product has a viscosity in the range of 3,000 to 10,000 mPa S and has a number average molecular weight of from 1,000 to 15,000 g/mol, wherein the hydroxyl number of the resulting condensation products is from 300 to 1,000 g/mol, and
   wherein the polyalkanolamine polymer is not alkoxylated.

2. A cleaning composition according to claim 1 wherein the cleaning composition is selected from the group consisting of hard surface cleaning compositions, liquid hand dishwashing compositions, solid automatic dishwashing compositions, liquid automatic dishwashing, and tab/unit dose form automatic dishwashing compositions.

3. A cleaning composition according to claim 1 wherein the detergent or cleaning composition comprises from about 0.05% to about 10% by weight of the detergent or cleaning composition, of the polyalkanolamine polymer.

4. A cleaning composition according to claim 1 wherein the surfactant system is selected from the group consisting of an anionic surfactant, cationic surfactant, nonionic surfactant, amphoteric surfactant, a zwitterionic surfactant, and mixtures thereof.

5. A cleaning composition according to claim 1 wherein the detergent or composition further comprises cleaning adjunct additives.

6. A method of cleaning dishware with a cleaning composition according to claim 1, said method comprising the steps of applying the composition onto the dishware.

7. A method of cleaning a hard surface with a cleaning composition according to claim 1, said method comprising the steps of applying the composition onto a hard surface.

8. A cleaning composition according to claim 1 wherein the detergent or cleaning composition comprises from about 0.15% to about 5% by weight of the detergent or cleaning composition, of the polyalkanolamine polymer.

* * * * *